United States Patent
Joung et al.

(10) Patent No.: US 11,586,712 B2
(45) Date of Patent: *Feb. 21, 2023

(54) METHOD, SYSTEM, AND NON-TRANSITORY COMPUTER-READABLE RECORD MEDIUM FOR PROVIDING CONTENT COPYRIGHT IN CHATROOM

(71) Applicant: LINE Plus Corporation, Seongnam-si (KR)

(72) Inventors: Eun Jung Joung, Seongnam-si (KR); Hyun Jung Lee, Seongnam-si (KR); Chaewon Jung, Seongnam-si (KR); Sungwhan Kim, Seongnam-si (KR); Seo Hyun Cho, Seongnam-si (KR)

(73) Assignee: LINE PLUS CORPORATION, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/505,764

(22) Filed: Oct. 20, 2021

(65) Prior Publication Data

US 2022/0035893 A1 Feb. 3, 2022

Related U.S. Application Data

(63) Continuation of application No. 16/879,875, filed on May 21, 2020, now Pat. No. 11,188,623.

(30) Foreign Application Priority Data

May 22, 2019 (KR) .......................... 10-2019-0060117

(51) Int. Cl.
*G06F 21/16* (2013.01)
*H04L 51/043* (2022.01)
(Continued)

(52) U.S. Cl.
CPC ............ *G06F 21/16* (2013.01); *H04L 51/043* (2013.01); *H04L 51/063* (2013.01); *H04L 51/10* (2013.01); *H04L 51/224* (2022.05)

(58) Field of Classification Search
CPC ...... G06F 21/16; G06F 51/224; G06F 51/043; G06F 51/063; G06F 51/10; H04L 51/043; H04L 51/10; H04L 51/063; H04L 51/224
See application file for complete search history.

(56) References Cited

U.S. PATENT DOCUMENTS

| 6,571,234 B1 * | 5/2003 | Knight | G06Q 30/02 |
| 7,159,011 B1 * | 1/2007 | Knight | G06Q 10/107 |
| | | | 707/E17.108 |

(Continued)

FOREIGN PATENT DOCUMENTS

| EP | 2860686 A1 * | 4/2015 | .......... G06Q 10/107 |
| KR | 10-2002-0074304 A | 9/2002 | |

*Primary Examiner* — Sargon N Nano
(74) *Attorney, Agent, or Firm* — Harness, Dickey & Pierce, P.L.C.

(57) ABSTRACT

Disclosed is a method, system, and non-transitory computer-readable record medium for protecting content copyright in a chatroom. A content protection method includes adding, by at least one processor, a mark to content in a chatroom, the mark including chatroom information for identifying the chatroom in response to a user request from a user associated with the content in the chatroom, and executing, by the at least one processor, a function corresponding to the user request using the content to which the mark is added.

18 Claims, 14 Drawing Sheets

(51) Int. Cl.
*H04L 51/10* (2022.01)
*H04L 51/063* (2022.01)
*H04L 51/224* (2022.01)

(56) References Cited

U.S. PATENT DOCUMENTS

| | | | | |
|---|---|---|---|---|
| 7,363,278 B2* | 4/2008 | Schmelzer | | G06Q 50/18 |
| | | | | 375/295 |
| 8,799,756 B2* | 8/2014 | Grosz | | G06F 40/12 |
| | | | | 715/202 |
| 8,949,321 B2* | 2/2015 | Gowen | | H04N 1/0019 |
| | | | | 709/219 |
| 9,275,051 B2* | 3/2016 | King | | G06F 16/332 |
| 9,591,451 B1* | 3/2017 | Knight | | H04M 1/72412 |
| 2003/0037010 A1 | 2/2003 | Schmelzer | | |
| 2003/0208535 A1 | 11/2003 | Appleman et al. | | |
| 2003/0220972 A1* | 11/2003 | Montet | | H04L 51/04 |
| | | | | 709/204 |
| 2005/0108573 A1* | 5/2005 | Bennett | | G06F 11/3048 |
| | | | | 709/224 |
| 2006/0004703 A1* | 1/2006 | Spivack | | G06F 16/93 |
| 2007/0043740 A1* | 2/2007 | Saito | | H04N 21/4788 |
| | | | | 348/E5.002 |
| 2007/0082738 A1* | 4/2007 | Fickie | | A63F 13/87 |
| | | | | 463/42 |
| 2010/0125580 A1* | 5/2010 | Westen | | G06F 16/24575 |
| | | | | 707/737 |
| 2013/0125013 A1* | 5/2013 | Lettau | | H04N 21/6175 |
| | | | | 715/748 |
| 2014/0297766 A1* | 10/2014 | Imes | | H04L 51/04 |
| | | | | 709/206 |
| 2015/0215424 A1* | 7/2015 | Chun | | H04L 67/60 |
| | | | | 709/217 |
| 2015/0246286 A1 | 9/2015 | Branson et al. | | |
| 2015/0379751 A1* | 12/2015 | Raichelgauz | | H04H 20/31 |
| | | | | 382/100 |
| 2017/0109505 A1* | 4/2017 | Nakata | | G06F 21/10 |
| 2017/0169235 A1* | 6/2017 | Schmelzer | | G06F 21/60 |
| 2017/0287479 A1 | 10/2017 | Tamura et al. | | |
| 2018/0053213 A1* | 2/2018 | Wrzesinski | | G06Q 30/0258 |
| 2018/0145937 A1 | 5/2018 | Choi et al. | | |
| 2018/0173725 A1* | 6/2018 | De Guerre | | G06F 16/5866 |
| 2019/0190865 A1* | 6/2019 | Jeon | | G06T 11/60 |
| 2020/0228580 A1* | 7/2020 | Choi | | H04L 12/1822 |

\* cited by examiner

METHOD, SYSTEM, AND NON-TRANSITORY COMPUTER-READABLE RECORD MEDIUM FOR PROVIDING CONTENT COPYRIGHT IN CHATROOM

CROSS-REFERENCE TO RELATED APPLICATIONS

This U.S. non-provisional application is a continuation of U.S. application Ser. No. 16/879,875, filed on May 21, 2020, which claims the benefit of priority under 35 U.S.C. § 119 to Korean Patent Application No. 10-2019-0060117, filed May 22, 2019, the entire contents of each of which are incorporated herein by reference in their entirety.

BACKGROUND

Technical Field

One or more example embodiments relate to methods, systems, and/or non-transitory computer readable record media for protecting contents in a chatroom.

Related Art

An instant messenger is a general communication tool, and refers to software capable of sending and receiving messages or data in real time. A user may register a contact on a messenger, and may exchange messages with a counterpart included in a contact list in real time.

Such a messenger function is popular in a mobile environment of a mobile communication terminal as well as a personal computer (PC).

With the increasing popularity of an instant messenger and diversity of functions provided through the instant messenger, an open chat function that allows a chat without adding a friend using a telephone number or an identification is available.

SUMMARY

Some example embodiments may add a mark that includes chatroom information to content to be uploaded to a chatroom.

Some example embodiments may provide an access to a chatroom that is a source of content using a mark added to the content.

Some example embodiments may add a mark to content in response to a screenshot request or a sharing request for the content in a chatroom.

Some example embodiments may send a notification to an original content creator in response to a screenshot request or a sharing requesting for content in a chatroom.

Some example embodiments may execute screenshot or sharing in response to approval of an original content creator for content in a chatroom.

According to at least one example embodiment, there is provided a content protection method implemented by a computer system including at least one processor configured to execute computer-readable instructions included in a memory. The method includes adding, the at least one processor, a mark to content, the mark including chatroom information for identifying the chatroom in response to a user request from a user associated with the content in the chatroom, and executing, by the at least one processor, a function corresponding to the user request using the content to which the mark is added.

The adding may include providing an edit user interface (UI) for adjusting at least one of a size or a position of the mark added to the content.

The adding may include determining at least one of a size or a position of the mark to be added to the content based on an image-based analysis result of the content.

The adding may include receiving a mark addition request from the user every time the user request is recognized, or receiving the mark adding request in advance.

The mark may include chatroom information used for an electronic device of another user sharing the content.

The method further includes creating the mark in an image or pattern form recognizable at a server, to make a sharing path of the content trackable through interaction with the server, and displaying tracking information about the sharing path of the content through the mark on an electronic device of another user sharing the content.

The content protection method may further include forwarding, by the at least one processor, a notification to an electronic device of at least one original content creator having sent an original version of the content in the chatroom, the forwarding being in response to recognizing a screenshot request or a sharing request as the user request for the content.

The forwarding of the notification may include selecting at least one contact having sent a message included in a screenshot range as at least one notification forward target in response to designating the screenshot range in the chatroom.

The selecting may include analyzing chat content included in the screenshot range and excluding one or more contacts from the at least one notification forward target.

The notification may include a function for sending an intent from the at least one original content creator regarding whether to approve use of the content, and the adding may include adding the mark to the content in response to receiving an approval intent from an electronic device of the at least one original content creator through the notification.

The adding may include, in response to the notification being forwarded to the at least one original content creator including two or more original content creators, adding the mark to the content of one of the at least one original content creator that sends an approval intent, and disallowing a screenshot operation and a sharing operation for the content of another of the at least one original content creator that sends a disapproval intent.

The content protection method may further include accessing, by the at least one processor, a storage space associated with a screenshot at a point in time at which a desired period of time elapses based on a point in time at which a screenshot request is recognized, in response to recognizing the screenshot request as the user request for the content, and leaving first content, by the at least one processor, to which the mark is added and deleting second content by the at least one processor to which the mark is not added, from among contents stored in the storage space during the desired period of time.

According to at least one example embodiment, there is provided a non-transitory computer-readable record medium storing instructions that, when executed by a processor, cause the processor to perform the content protection method.

According to at least one example embodiment, there is provided a computer system including at least one processor configured to execute computer-readable instructions included in a memory. The at least one processor is configured to add a mark to content, the mark including chatroom information for identifying the chatroom in response to a user request from a user associated with the content in the chatroom, and execute a function corresponding to the user request using the content to which the mark is added.

Further areas of applicability will become apparent from the description provided herein. The description and specific examples in this disclosure are intended for purposes of illustration only and are not intended to limit the scope of the present disclosure.

DETAILED DESCRIPTION

Figure 1:
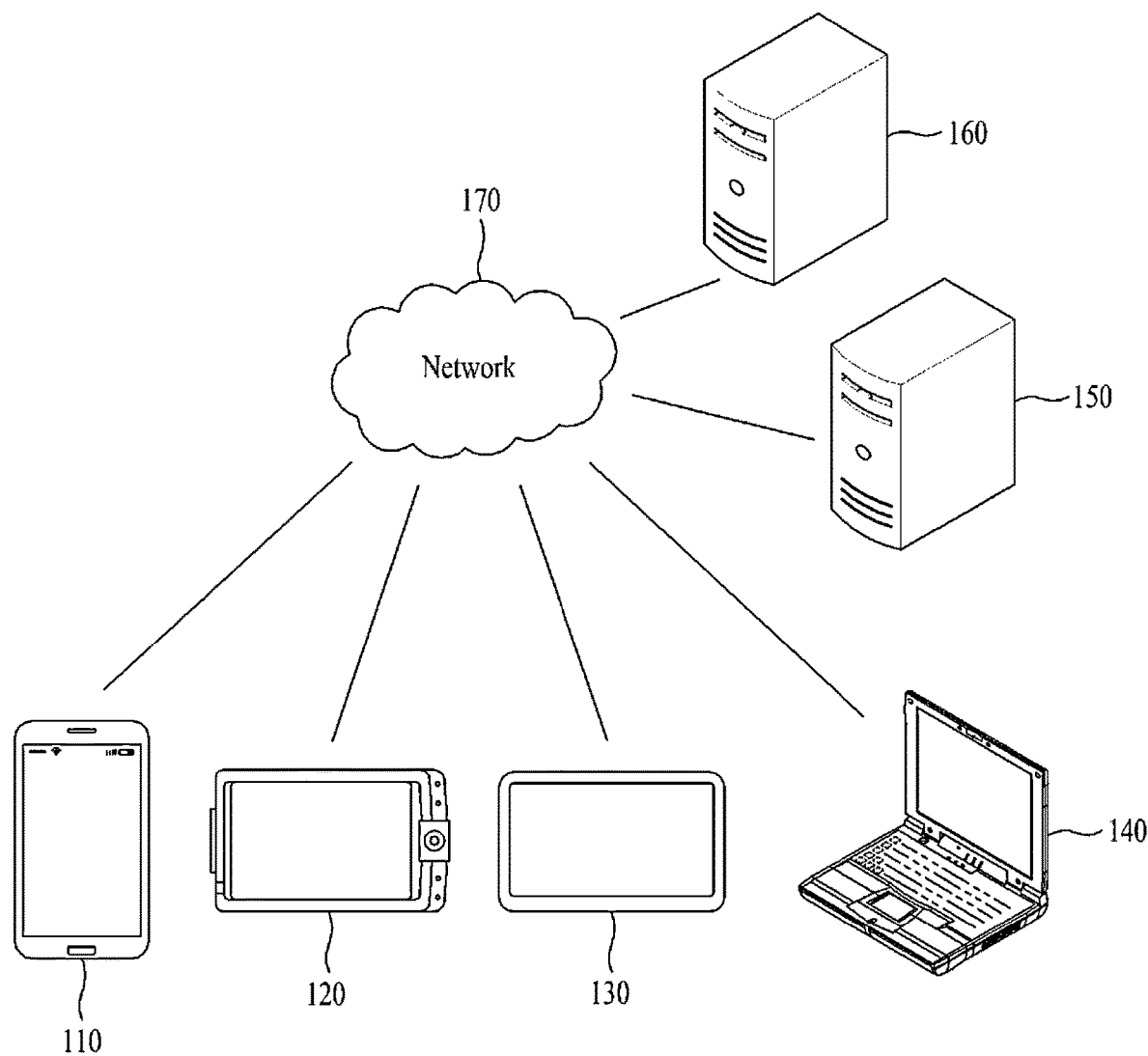
FIG. 1 is a diagram illustrating an example of a network environment according to at least one example embodiment.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, some example embodiments will be described with reference to the accompanying drawings.

Some example embodiments relate to technology for protecting contents in a chatroom.

Some example embodiments of the present disclosure may add a mark that includes chatroom information to content to be uploaded to a chatroom or content for which a screenshot or sharing with another chatroom is requested in the chatroom, may effectively protect the content in the chatroom based on the chatroom information included in the mark, and may easily access the chatroom that is a source of the content not to mention of tracking the content.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto.

Each of the plurality of electronic devices 110, 120, 130, and 140 may be a fixed terminal or a mobile terminal that is configured as a computer system. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, a game console, a wearable device, an Internet of things (IoT) device, a virtual reality (VR) device, an augmented reality (AR) device, and the like. For example, although FIG. 1 illustrates a shape of a smartphone as an example of the electronic device 110, the electronic device 110 used herein may refer to one of various types of physical computer systems capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, or a satellite network) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and 140 over the network 170. For example, the server 150 may be a system that provides a first service to the plurality of electronic devices 110, 120, 130, and 140 connected over the network 170. The server 160 may be a system that provides a second service to the plurality of electronic devices 110, 120, 130, and 140 connected over the network 170. For example, the server 150 may provide, as the first service, a service (e.g., a messaging service) intended by an application through the application as a computer program installed and executed on the plurality of electronic devices 110, 120, 130, and 140. As another example, the server 160 may provide, as the second service, a service that distributes a file for installing and executing the application to the plurality of electronic devices 110, 120, 130, and 140.

Figure 2:
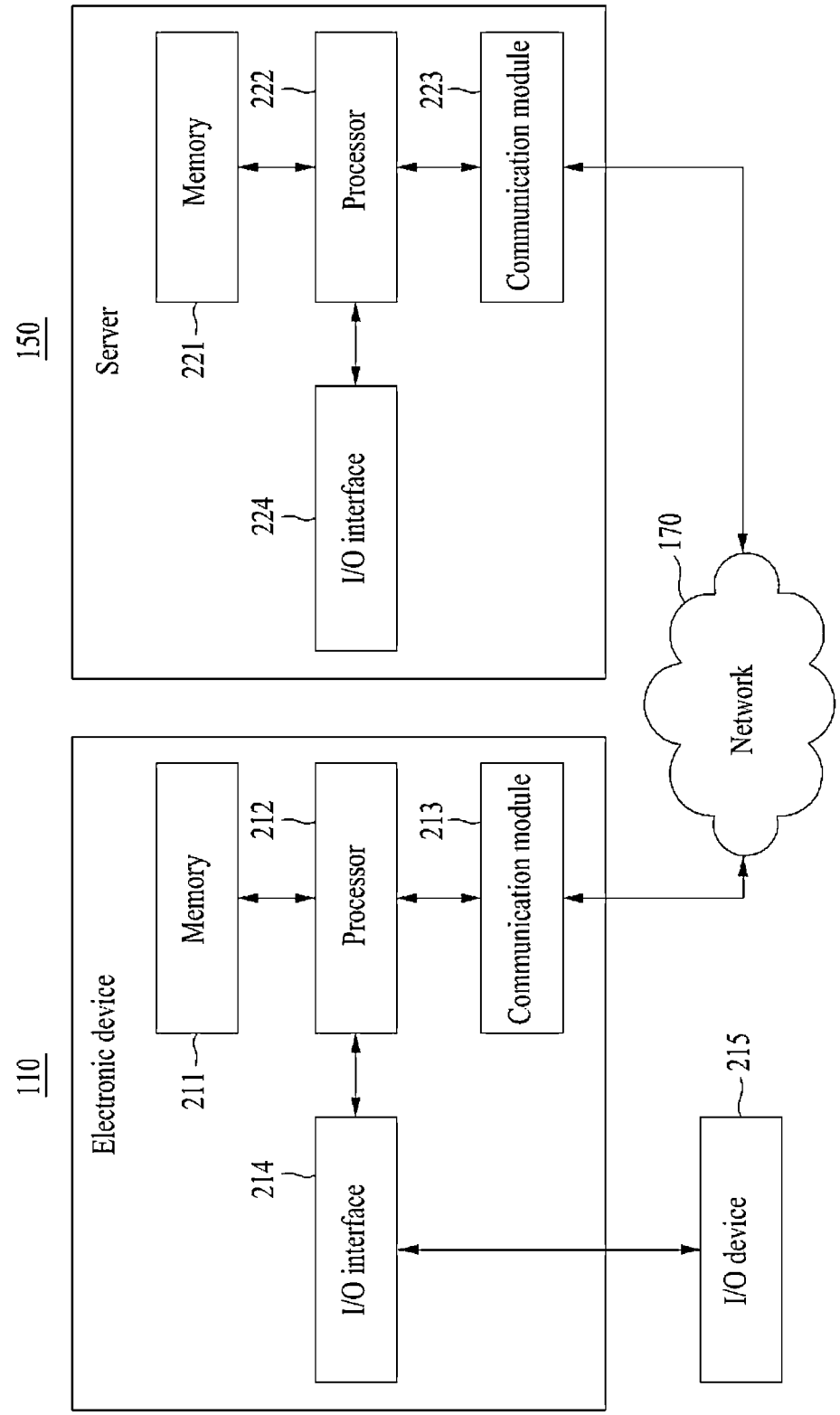
FIG. 2 is a diagram illustrating an example of an electronic device and a server according to at least one example embodiment.

FIG. 2 is a block diagram illustrating an example of an electronic device and a server according to at least one example embodiment. Description is made using the electronic device 110 as an example of an electronic device and the server 150 as an example of a server with reference to FIG. 2. Also, the other electronic devices 120, 130, and 140 or the server 160 may have the same or similar configuration as that of the electronic device 110 or the server 150.

Referring to FIG. 2, the electronic device 110 may include a memory 211, a processor 212, a communication module 213, and an input/output (I/O) interface 214, and the server 150 may include a memory 221, a processor 222, a communication module 223, and an I/O interface 224. The memory 211, 221 may include a permanent mass storage device (e.g., random access memory (RAM), a read only memory (ROM), a disk drive, a solid state drive (SSD), or a flash memory) as a non-transitory computer-readable record medium. The permanent mass storage device (e.g., ROM, SSD, flash memory, or disk drive) may be included in the electronic device 110 or the server 150 as a permanent storage device separate from the memory 211, 221. Also, an OS or at least one program code, for example, a code for a browser installed and executed on the electronic device 110 or an application installed and executed on the electronic device 110 to provide a specific service, may be stored in the memory 211, 221. Such software components may be loaded from another non-transitory computer-readable record medium separate from the memory 211, 221. The other non-transitory computer-readable record medium may include a non-transitory computer-readable record medium, for example, a floppy drive, a disk, a tape, a DVD/CD-ROM drive, a memory card, etc. According to other example embodiments, software components may be loaded to the memory 211, 221 through the communication module 213, 223, instead of the non-transitory computer-readable record medium. For example, at least one program may be loaded to the memory 211, 221 based on a computer program, for example, the application, installed by files provided over the network 170 from developers or a file distribution system, for example, the server 160, providing an installation file of the application.

The processor 212, 222 may be configured to process instructions of a computer program by performing basic arithmetic operations, logic operations, and I/O operations. The computer-readable instructions may be provided from the memory 211, 221 or the communication module 213, 223 to the processor 212, 222. For example, the processor 212, 222 may be configured to execute received instructions in response to the program code stored in the storage device, such as the memory 211, 221.

The communication module 213, 223 may provide a function for communication between the electronic device 110 and the server 150 over the network 170 and may provide a function for communication between the electronic device 110 and/or the server 150 with another electronic device, for example, the electronic device 120 or another server, for example, the server 160. For example, the processor 212 of the electronic device 110 may transfer a request created based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, content, a file, etc., of the server 150 received through the communication module 213 may be transferred to the processor 212 or the memory 211, and content, a file, etc., may be stored in a storage medium, for example, the permanent storage device, further includable in the electronic device 110.

The I/O interface 214 may be a device used for interface with an I/O apparatus 215. For example, an input device may include a device, for example, a keyboard, a mouse, a microphone, and/or a camera, and an output device may include a device, for example, a display, a speaker, and/or a haptic feedback device. As another example, the I/O interface 214 may be a device for interface with an apparatus in which an input function and an output function are integrated into a single function, for example, a touchscreen. The I/O apparatus 215 may be configured as a single device with the electronic device 110. Also, the I/O interface 224 of the server 150 may be a device for interface with an apparatus (not shown) for input or output that may be connected to the server 150 or included in the server 150. For example, when the processor 212 of the electronic device 110 processes an instruction of a computer program loaded to the memory 211, content or a service screen configured based on data provided from the server 150 or the electronic device 120 may be displayed on the display through the I/O interface 214.

According to other example embodiments, the electronic device 110 and the server 150 may include a smaller or greater number of components than a number of components shown in FIG. 2. However, there is no need to clearly illustrate many components according to the related art. For example, the electronic device 110 may include at least a portion of the I/O apparatus 215, or may further include other components, for example, a transceiver, a global positioning system (GPS) module, a camera, a variety of sensors, a database (DB), and the like. For example, if the electronic device 110 is a smartphone, the electronic device 110 may be configured to further include a variety of components, for example, an acceleration sensor, a gyro sensor, a camera module, various physical buttons, a button using a touch panel, an I/O port, a vibrator for vibration, etc., which are generally included in the smartphone.

Hereinafter, methods and/or systems for protecting a content copyright in a chatroom according to some example embodiments is described.

The term "chatroom" used herein may refer to an interface screen for providing messages exchanged between users for example, an interface screen of a chat function capable of exchanging messages through a communication session established between accounts of users in a messenger or a social network service (SNS), and an interface screen of an open chat function capable of making an immediate chat using a link (e.g., a uniform resource locator (URL) without a friend addition function using a telephone number or an identifier (ID). An open chat link may include a function capable of executing a chatroom of a corresponding link by automatically executing a messenger to immediately initiate a chat in response to a click on the link.

Hereinafter, although description is made based on an example of a chatroom of a messenger, it is provided as an example only. Any type of chat-based interfaces of a service in which a plurality of users participate and newly joins frequently occurs using an account or a telephone number of a user as well as a link.

Figure 3:
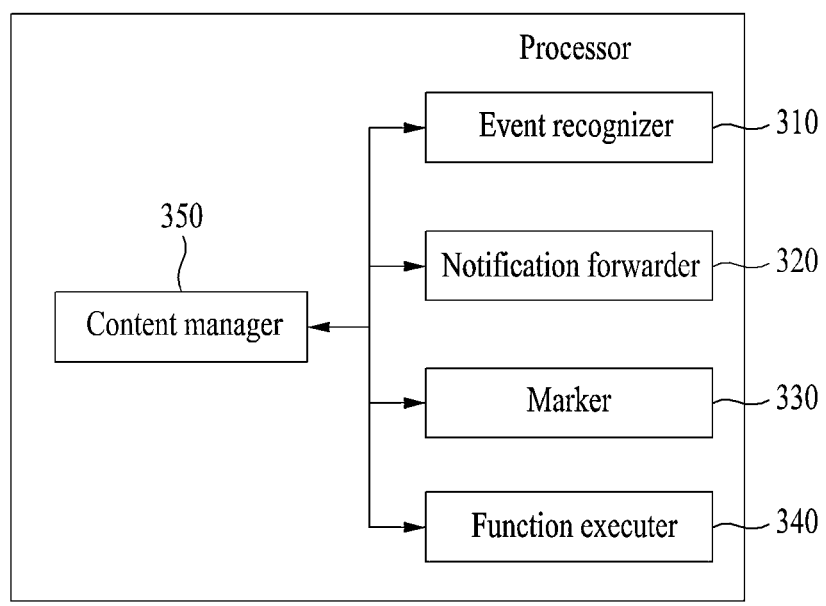
FIG. 3 is a diagram illustrating an example of components includable in a processor of an electronic device according to at least one example embodiment.

FIG. 3 is a diagram illustrating an example of components includable in a processor of an electronic device according to at least one example embodiment.

A content protection system implemented by a computer may be configured in the electronic device 110. For example, the content protection system may be configured in a form of a program that independently operates or in an in-app form of a specific application to be operable on the specific application and may provide a messaging service through interaction with the server 150.

The content protection system configured in the electronic device 110 may perform the following content protection method in response to an instruction provided from an application installed on the electronic device 110.

Referring to FIG. 3, to perform the content protection method according to some example embodiments, the processor 212 of the electronic device 110 may include an event recognizer 310, a notification forwarder 320, a marker 330, a function executer 340, and a content manager 350 as components of the processor 212. Depending on some example embodiments, the components of the processor 212 may be selectively included in or excluded from the processor 212. Also, depending on some example embodiments, the components of the processor 212 may be separated or merged for functional representation of the processor 212.

The processor 212 and the components of the processor 212 may control the electronic device 110 to perform operations included in the content protection method. For example, the processor 212 and the components of the processor 212 may be configured to execute an instruction according to a code of at least one program and/or a code of an OS included in the memory 211.

Here, the components of the processor 212 may be representations of different functions of the processor 212 performed by the processor 212 in response to an instruction (e.g., an instruction provided from an application executed on the electronic device 110) provided from a program code stored in the electronic device 110. For example, the event recognizer 310 may be used as a functional representation of the processor 212 that controls the electronic device 110 to recognize an input event associated with content in a chatroom in response to the instruction.

The processor 212 may read a desired instruction from the memory 211 to which instructions associated with control of the electronic device 110 are loaded. In this case, the read instruction may include an instruction for controlling the processor 212 to perform the content protection method.

Figure 4:
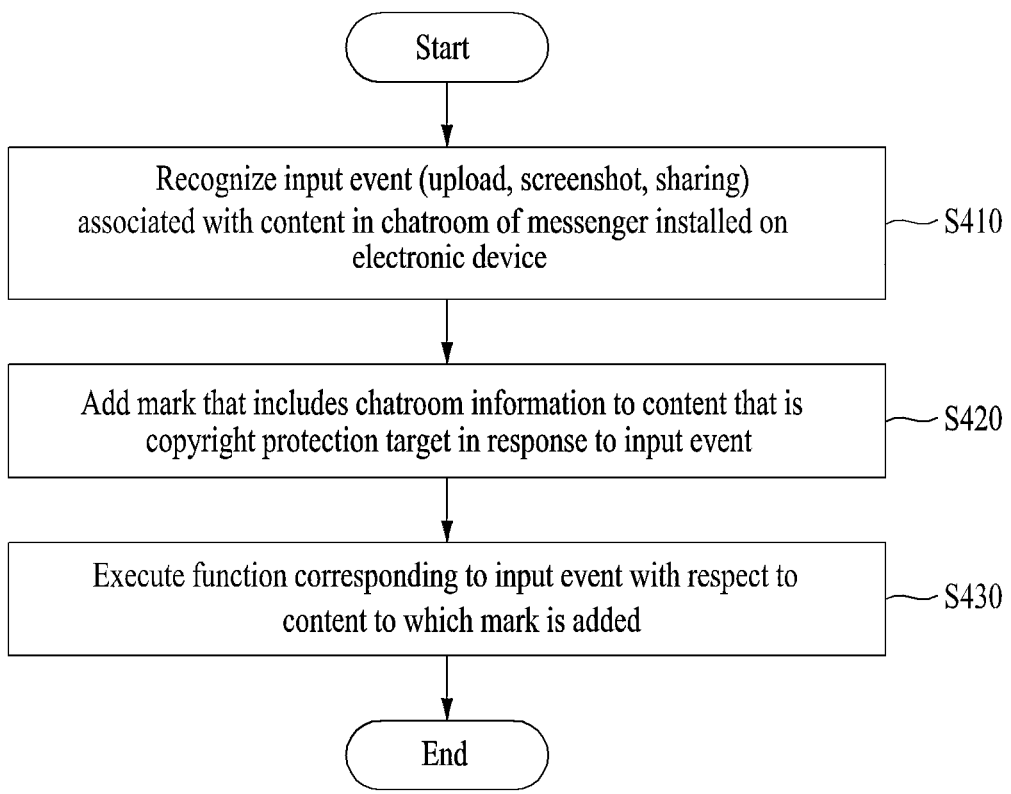
FIG. 4 is a flowchart illustrating an example of a content protection method performed by an electronic device according to at least one example embodiment.

FIG. 4 is a flowchart illustrating an example of a content protection method performed by an electronic device according to at least one example embodiment.

Referring to FIG. 4, in operation 5410, the event recognizer 310 may recognize an input event associated with or predefined in association with content in a chatroom (hereinafter, briefly referred to as a chatroom) of a messenger installed on the electronic device 110. Here, the content may be a target (hereinafter, a copyright protection target) of which a copyright is to be protected, and may inclusively refer to any types of data exchanged between users through the chatroom, for example, a text, an image, a video, and an audio. Herein, to protect a content copyright by preventing image-based content sent in a chatroom or captured image content from being indiscreetly shared, an upload request, a screenshot request, and a sharing request of content among input events in the chatroom may be defined as an instruction for calling a copyright protection function. That is, the event recognizer 310 may recognize the upload request, the screenshot request, and the sharing request that are input events associated with the content in the chatroom as the instruction for calling the copyright protection function.

In operation 5420, in response to recognizing the input event corresponding to the instruction for calling the copyright protection function in the chatroom, the marker 330 may add, to content that is a copyright protection target, a mark that includes chatroom information for identifying the chatroom. The mark relates to protecting a copyright for original data (e.g., a text, an image, a video, or an audio) and may be created using a method capable of containing information in a desired pattern, for example, an image and a watermark, a quick read (QR) code, or a barcode. Here, the mark may be created in an image or pattern form recognizable at the server 150 that is capable of tracking a copyright protection target through interaction with the electronic device as represented by 110 in FIG. 2. For example, the marker 330 may create a mark that includes information capable of identifying a chatroom, for example, an ID or a link (e.g., a uniform resource locator (URL)) of a chatroom in which an input event is recognized and may add the mark to content that is specified as the copyright protection target in response to the input event. In response to an upload request, content selected to be uploaded to the chatroom may be specified as the copyright protection target. In response to a screenshot request, content included in a screenshot range of the chatroom may be specified as the copyright protection target. In response to a sharing request, content selected to be shared with another chatroom or another medium through the chatroom may be specified as the copyright protection target. As another example, the marker 330 may create and add a mark that includes information (e.g., a user ID) about an original content creator with chatroom information about the content specified as the copyright protection target. Here, the original content creator may refer to a user that sends an original version of the content specified as the copyright protection target in the chatroom as a content included in the chatroom. Content sent and received through the chatroom may be managed using a unique identifier (a message ID) of a message type. Through this, the marker 330 may identify the content specified as the copyright protection target and the original content creator, and may add the mark that includes information about the original content creator to the specified content. Here, every time the input event is recognized, the marker 330 may receive a mark addition request from the user of the electronic device 110. Depending on some example embodiments, a request for adding a mark to uploaded content may be received in advance as a mark setting.

In operation 5430, the function executer 340 may execute a function, for example, an upload function, a screenshot function, and a sharing function, corresponding to the input event recognized in operation 5410. That is, in response to the input event recognized in the chatroom, the function executer 340 may upload or capture the content specified as the copyright protection target in a state in which the mark is added and thereby may store or share the content in the chatroom.

Therefore, in response to recognizing the input event, for example, the upload request, the screenshot request, and the sharing request, associated with the content in the chatroom, the processor 212 may add the mark that includes the chatroom information to the content and may perform a function corresponding to the input event using the content to which the mark is added.

Figure 5:
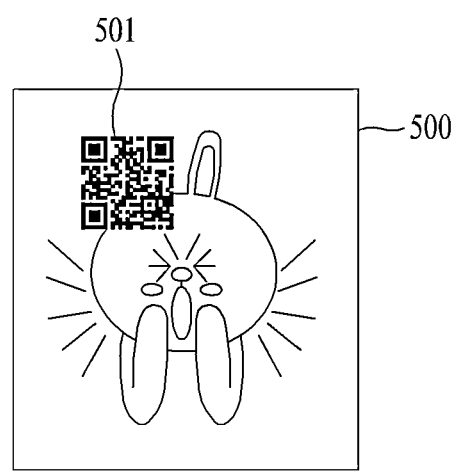
FIGS. 5 and 6 illustrate an example of a process of adding a quick read (QR) code to content according to at least one example embodiment.
Figure 6:
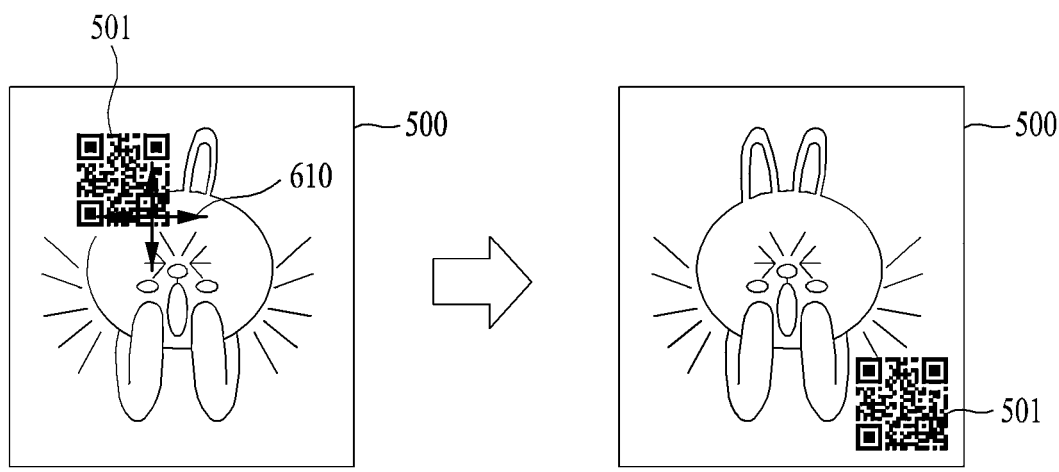

FIGS. 5 and 6 illustrate an example of a process of adding a QR code to content according to at least one example embodiment.

Referring to FIG. 5, the marker 330 may add a QR code 501 that includes chatroom information to content 500 specified as a copyright protection target, for example, content to be uploaded to chatroom, content included in screenshot range, or content to share with another chatroom or medium.

Referring to FIG. 6, the marker 330 may provide an edit user interface (UI) 610 for adjusting a size or a position of the QR code 501 added to the content 500. Therefore, the user may directly adjust the size or the position of the QR code 501 added to the content 500 using the edit UI 610. As another example, in addition to allowing the user to directly adjust the size or the position of the QR code 501, the marker 330 may automatically determine the size or the position of the QR code 501 based on a result of analyzing the content 500 using an image-based analysis method. For example, the marker 330 may extract an area in which significant information (e.g., a text or image object) is absent or a background area and may add the QR code 501 to be in the extracted area.

Figure 7:
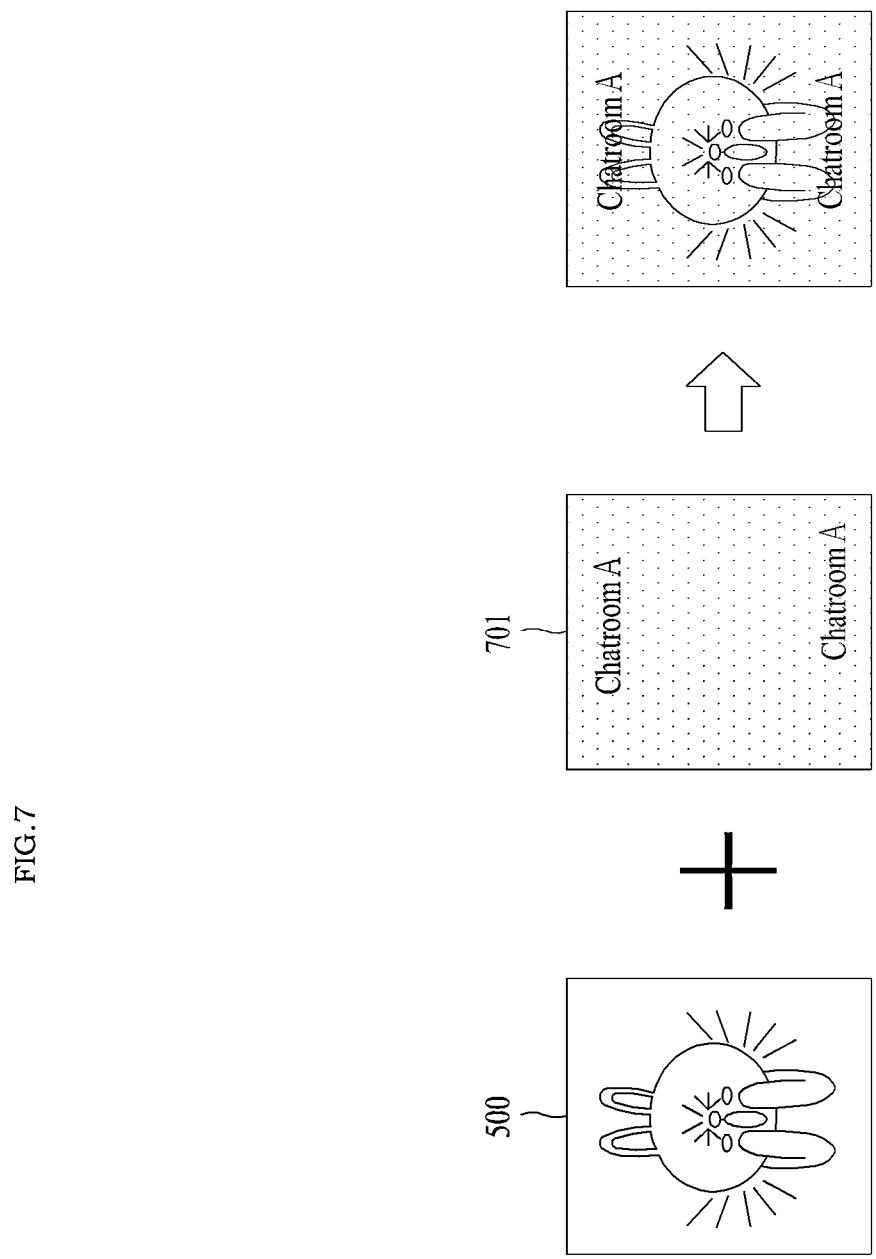
FIG. 7 illustrates an example of a process of adding a watermark to content according to at least one example embodiment.

FIG. 7 illustrates an example of a process of adding a watermark to content according to at least one example embodiment.

Referring to FIG. 7, the marker 330 may add a mark that includes chatroom information to the content 500 specified as the copyright protection target. Here, the marker 330 may add a watermark 701 as a different type mark, instead of using a QR code. Likewise, the marker 330 may provide an edit UI that allows the user to directly adjust a size or a position of the watermark 701 added to the content 500, and may automatically determine a size or a position of the watermark 701 based on a result of analyzing an image of the content 500.

Although the description is made by using a QR code and a watermark as some examples of a mark, it is provided as examples only. Any types of marks capable of including chatroom information and protecting a content copyright or tracking the content may apply.

Figure 8:
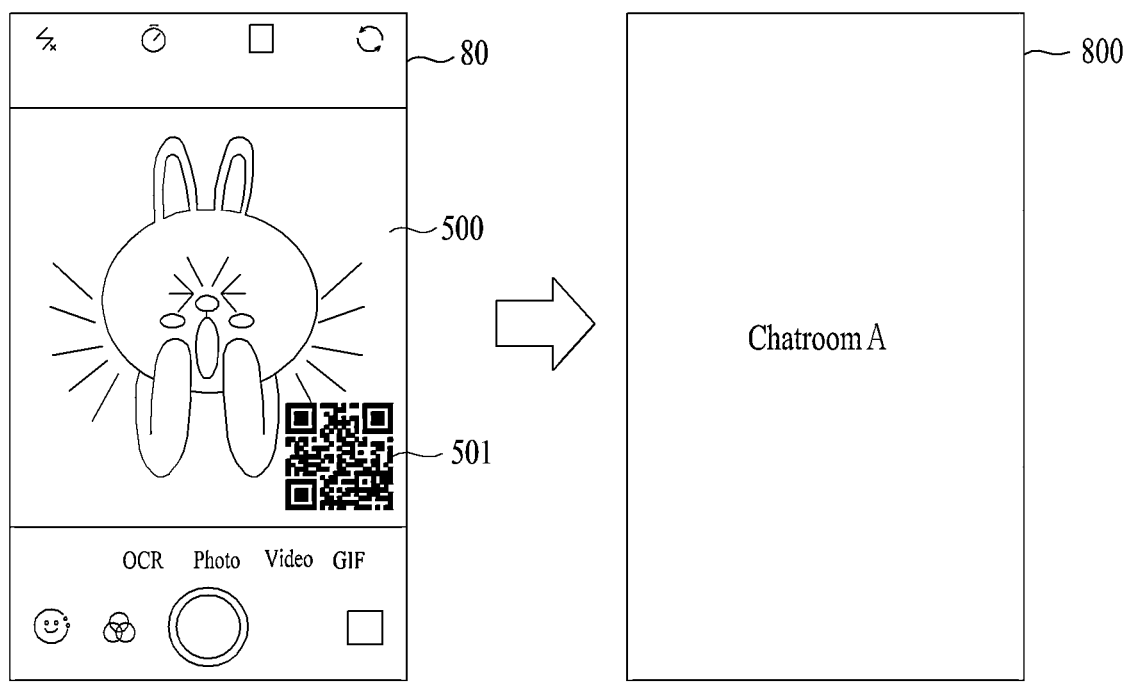
FIGS. 8 and 9 illustrate examples of using content to which a QR code is added according to at least one example embodiment.
Figure 9:
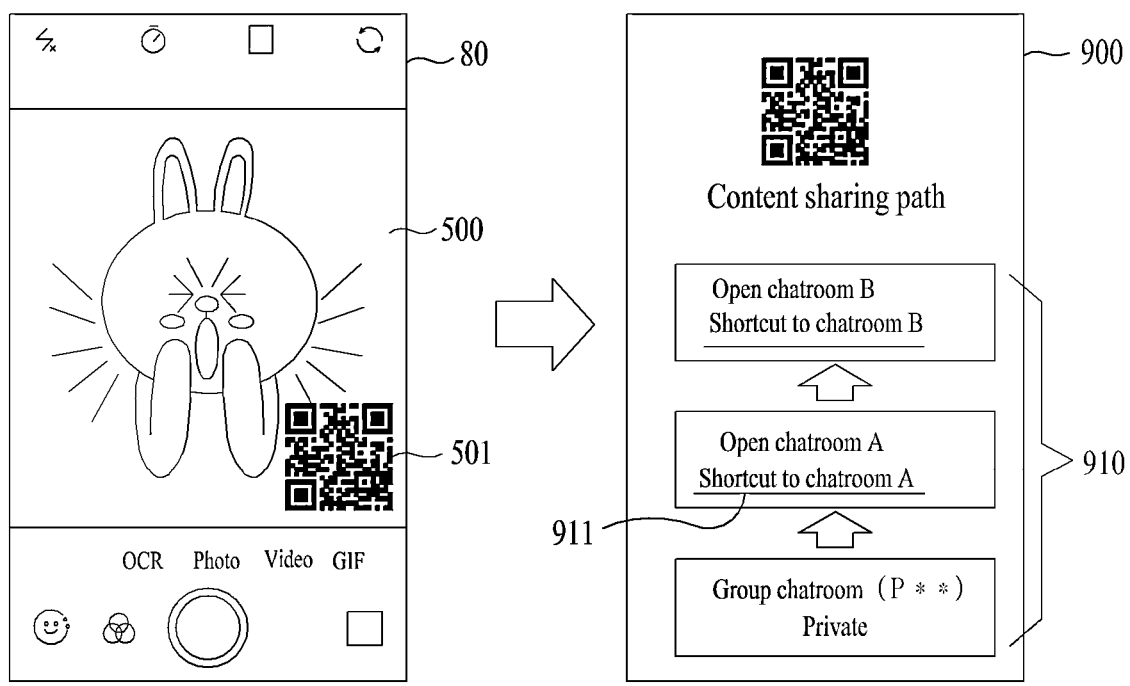

FIGS. 8 and 9 illustrate examples of using content to which a QR code is added according to at least one example embodiment.

Referring to FIG. 8, the electronic device 120 of the user sharing the content 500 to which the QR code 501 is added may provide an access to a chatroom 800 that is a source of the content 500 based on the chatroom information included in the QR code 501, in response to a selection on the content 500 on a screen 80 of the electronic device 120 or recognition of the QR code 501 in the content 500 from a camera of the electronic device 120. If the user of the electronic device 120 is participating in or has joined the chatroom 800, the user may be immediately directed to the chatroom 800. Otherwise, a chatroom introduction screen may be initially provided. A name, a tag, operator information, and a number of participants of the chatroom may be displayed on the chatroom introduction screen. The chatroom introduction screen may include a join request interface for inputting a join request. Therefore, if users not joining the chatroom 800 desire to use the content 500 to which the QR code 501 is added, an introduction screen of the chatroom 800 that is a source of the content 500 may be provided. Because the chatroom information is included in the QR code 501, the QR code 501 may be used for content protection or tracking and also may be used as a method of promoting the chatroom 800.

Referring to FIG. 9, the electronic device 120 of the user sharing the content 500 to which the QR code 501 is added may provide a sharing screen 900 for the content 500 through interaction with the server 150 in response to a selection on the content 500 on the screen 80 of the electronic device 120 or recognition of the QR code 501 in the content 500 from a camera of the electronic device 120. The sharing screen 900 may include tracking information 910 provided from the server 150 for a sharing path of the content 500. Here, the tracking information 910 may include a list of chatrooms having a history of sharing the content 500 and a shortcut link 911 that allows a user to immediately connect to a corresponding chatroom included in the list of chatrooms. Each chatroom may be set to a public state in which access using the QR code 501 is allowed by an administrator (admin) or a private state in which the access using the QR code 501 is disallowed. A chatroom set to the private state in which the access using the QR code 501 is disallowed may be provided with the shortcut link 911 being removed.

If the user selects the shortcut link 911 of the specific chatroom on the sharing screen 900, the electronic device 120 may provide an access to the selected specific chatroom. Here, if the user of the electronic device 120 is participating in or has joined the selected specific chatroom, the user may be immediately directed to the selected specific chatroom. Otherwise, a chatroom introduction screen may be initially provided.

Although description is made based on an example of using content to which a QR code is added, a method of using content to which a different type mark, for example, a watermark, is added may apply in the same or similar manner.

Figure 10:
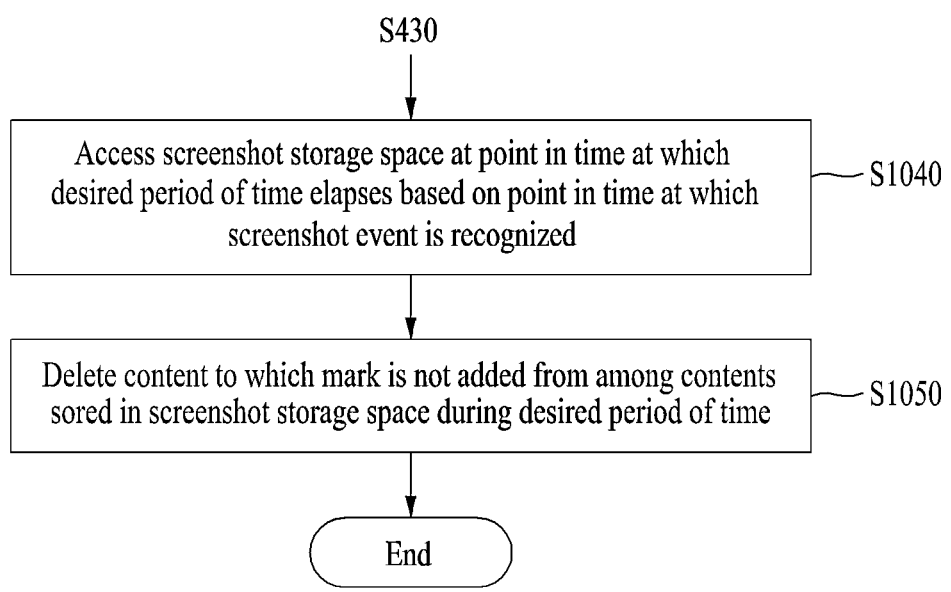
FIG. 10 is a flowchart illustrating another example of a content protection method performed by an electronic device according to at least one example embodiment.

FIG. 10 is a flowchart illustrating another example of a content protection method performed by an electronic device according to at least one example embodiment.

For example, operations S1040 and S1050 included in the content protection method of FIG. 10 may be included in the content protection method of FIG. 4.

Referring to FIG. 10, in operation S1040, the content manager 350 may access a storage space in which a screenshot is stored at a point in time at which a desired period of time (e.g., 10 seconds) elapses based on a point in time at which a screenshot event is recognized. Here, a screenshot storage space may refer to a local storage space allocated to the messenger.

In operation S1050, the content manager 350 may delete content to which a mark is not added, aside from content to which the mark is added from among contents stored in the screenshot storage space during a desired period of time.

Therefore, in response to a screenshot request as the input event associated with the chatroom, the content manager 350 may access the screenshot storage space after a desired period of time elapses and may delete a remaining screenshot excluding the content to which the mark is added.

As another example, the content manager 350 may analyze contents stored in the screenshot storage space and may delete content to which a mark is not added, aside from content to which the mark is added from among contents between which a similarity is greater than or equal to a desired level based on an analysis result. For example, the content manager 350 may classify images stored in the screenshot storage space into similar images based on an image analysis result and may delete a remaining image excluding an image to which a mark is added from among the classified similar images.

The content manager 350 may also access a storage space associated with the chatroom in addition to the screenshot storage space. The storage space is a space in which contents exchanged between users are stored periodically or at a desired point in time. The content manager 350 may delete remaining content excluding content to which a mark is added from among the contents stored in the corresponding space.

Figure 11:
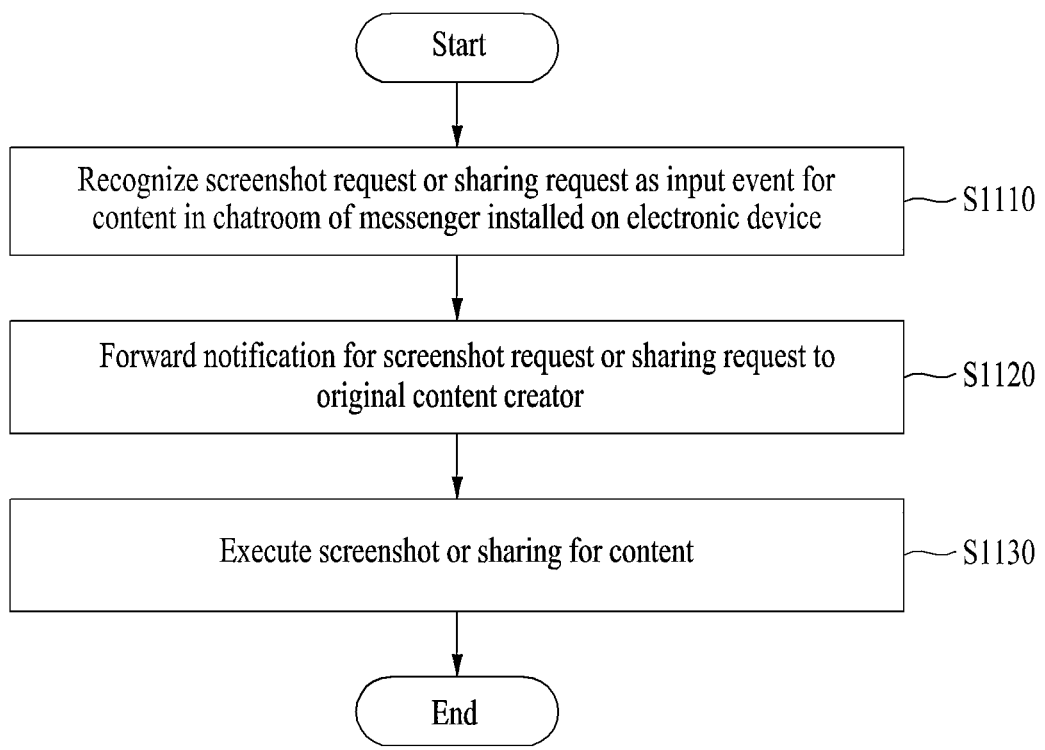
FIG. 11 is a flowchart illustrating another example of a content protection method performed by an electronic device according to at least one example embodiment.

FIG. 11 is a flowchart illustrating an example of a content protection method performed by an electronic device according to at least one example embodiment.

Referring to FIG. 11, in operation S1110, the event recognizer 310 may recognize a screenshot request or a sharing request as an input event for content included in a chatroom in the chatroom. Herein, the screenshot request or the sharing request among input events in the chatroom for content copyright protection may be defined as an instruction for calling a copyright protection function. That is, the event recognizer 310 may recognize the screenshot request or the sharing request that is an input event associated with the content as the instruction for calling the copyright protection function in the chatroom.

In operation S1120, in response to recognizing the input event corresponding to the instruction for calling the copyright protection function in the chatroom, the notification forwarder 320 may forward, to an original content creator, a notification for content specified as a copyright protection target for a chatroom content protection. In the case of the screenshot request, content included in a screenshot range of the chatroom may be specified as the copyright protection target. In the case of the sharing request, content selected to share with another chatroom or another medium may be specified as the copyright protection target. Here, the notification forwarder 320 may forward the notification for the screenshot request or the sharing request to an original content creator of the content specified as the copyright protection target. The notification may include chatroom information capable of identifying the chatroom, for example, an ID or a URL of the chatroom in which the input event is recognized. The notification may be forwarded to the electronic device 120 of the original content creator through a separate chatroom or a notification page by interacting with the server 150.

Figure 12:
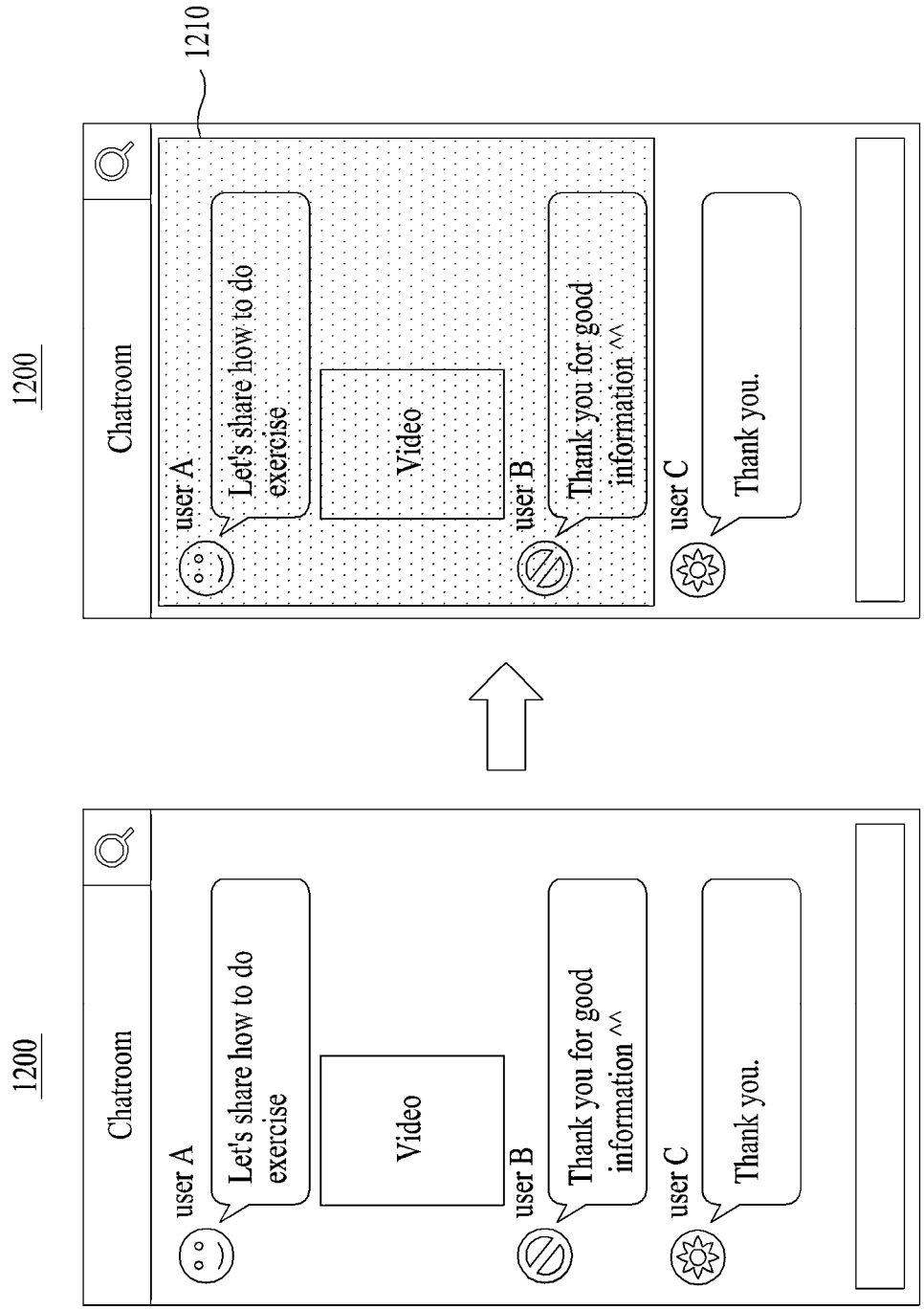
FIG. 12 illustrates an example of a process of specifying a target to which a content protection notification is to be forwarded according to at least one example embodiment.

Content sent and received through the chatroom may be managed using a unique identifier of a message type. Therefore, the notification forwarder 320 may identify the content specified as the copyright protection target and may identify a user, that is, the original content creator, which sends an original version of the identified content. At least two original content creators may be identified based on the content specified as the copyright protection target. For example, referring to FIG. 12, the user of the electronic device 110 may designate a screenshot range 1210 with respect to chat contents included in a chatroom 1200. Here, the notification forwarder 320 may select a contact that has sent a message included in the screenshot range 1210 as a target to which a notification is to be forwarded. For example, if a message sent from a user A and a message sent from a user B are included in the screenshot range 1210, the notification forwarder 320 may forward a screenshot notification by the user of the electronic device 110 to the user A and the user B. As another example, the notification forwarder 320 may analyze messages (e.g., chat contents) included in the screenshot range 1210, may identify a simple responder, and may forward a notification to an original content creator who is not the simple responder. The notification forwarder 320 may identify the simple responder who has sent a short or simple reply for example, "ok," "I see," "Thanks," or "Thank you," among chat contacts having sent messages included in the screenshot range 1210. For example, if a message sent from the user A and a message sent from the user B are included in the screenshot range 1210, the notification forwarder 320 may forward a notification to the user A that provides significant information and may exclude (e.g., may not forward to) the user B that is the simple responder from notification targets.

Referring again to FIG. 11, in operation 51130, once the notification is forwarded to the original content creator of the content specified as the copyright protection target, the function executer 340 may execute a function, for example, a screenshot function or a sharing function, corresponding to the input event recognized in operation S1110. That is, after the notification is forwarded to the original content creator, the function executer 340 may capture and store or share the content specified as the copyright protection target in response to the input event recognized in the chatroom.

Therefore, in response to recognizing an input event, for example, a screenshot request or a sharing request, corresponding to an instruction for calling a copyright protection function in the chatroom, the processor 212 may provide a notification to the original content creator having sent an original version of the content specified as the copyright protection target and then perform a function corresponding to the input event. The original content creator may recognize use of the content by another user, for example, screenshot or sharing of his or her content through the notification. If the original content creator selects the notification, the original content creator may be directed to the chatroom to which the content is sent based on the chatroom information.

Figure 13:
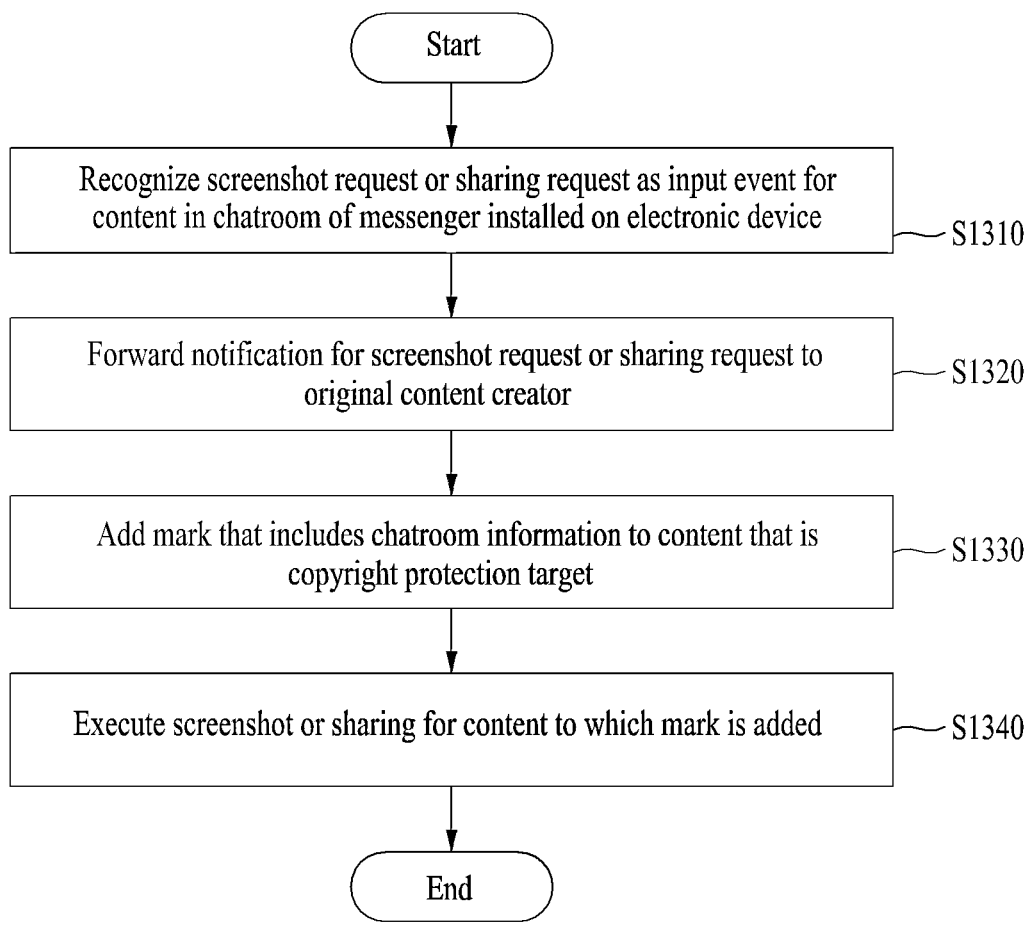
FIG. 13 is a flowchart illustrating another example of a content protection method performed by an electronic device according to at least one example embodiment.

FIG. 13 is a flowchart illustrating another example of a content protection method performed by an electronic device according to at least one example embodiment.

Referring to FIG. 13, in operation S1310, the event recognizer 310 may recognize a screenshot request or a sharing request as an input event for content included in a chatroom in the chatroom. That is, the event recognizer 310 may recognize the screenshot request or the sharing request that is an input event associated with the content as an instruction for calling a copyright protection function in the chatroom.

In operation S1320, in response to recognizing the input event corresponding to the instruction for calling the copyright protection function in the chatroom, the notification forwarder 320 may forward, to an original content creator, a notification for content specified as a copyright protection target for a chatroom content protection. In the case of the screenshot request, content included in a screenshot range of the chatroom may be specified as the copyright protection target. In the case of the sharing request, content selected to share with another chatroom or another medium may be specified as the copyright protection target. Here, the notification forwarder 320 may forward the notification for the screenshot request or the sharing request to an original content creator of the content specified as the copyright protection target. The notification may include chatroom information capable of identifying the chatroom, for example, an ID or a URL of the chatroom in which the input event is recognized.

In operation S1330, the marker 330 may add a mark that includes chatroom information to the content specified as the copyright protection target. For example, the marker 330 may create a QR code that includes information (e.g., an ID or a URL of the chatroom) capable of identifying the chatroom in which the input event is recognized, and may add the QR code to the content specified as the copyright protection target in response to the input event.

In operation S1340, once the notification is forwarded to the original content creator of the content specified as the copyright protection target, the function executer 340 may execute a function, for example, a screenshot function or a sharing function, corresponding to the input event recognized in operation S1310 for the content to which the mark is added. That is, in response to the input event for the chatroom, the function executer 340 may capture and store or share the content specified as the copyright protection target in a state in which the mark is added to the content.

Therefore, in response to recognizing an input event, for example, a screenshot request or a sharing request, corresponding to an instruction for calling a copyright protection function in the chatroom, the processor 212 may provide a notification to the original content creator having sent an original version of the content specified as the copyright protection target and also add, to the content, the mark that includes chatroom information and then perform a function corresponding to the input event using the content to which the mark is added.

Figure 14:
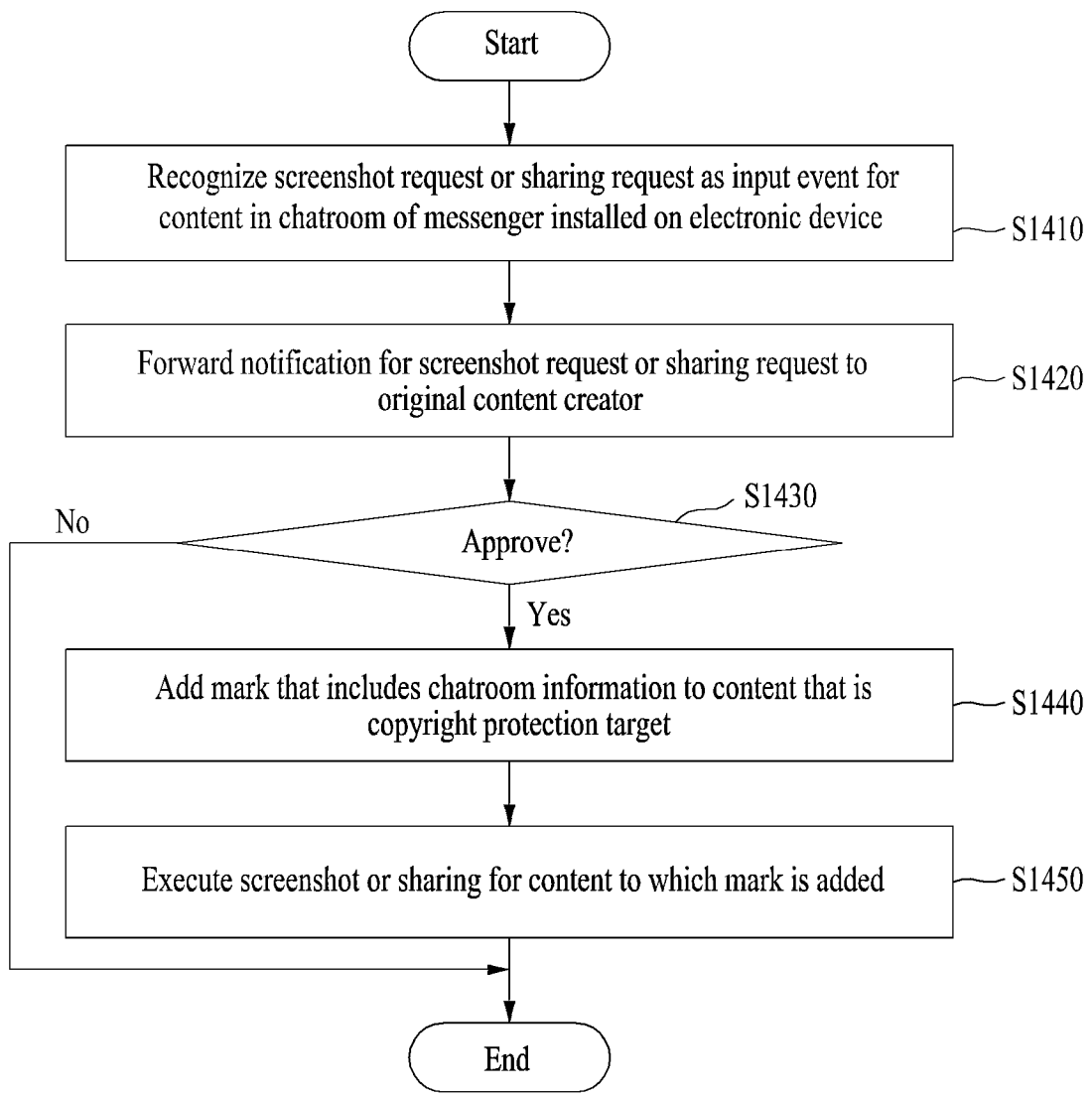
FIG. 14 is a flowchart illustrating another example of a content protection method performed by an electronic device according to at least one example embodiment.

FIG. 14 is a flowchart illustrating another example of a content protection method performed by an electronic device according to at least one example embodiment.

Referring to FIG. 14, in operation S1410, the event recognizer 310 may recognize a screenshot request or a sharing request as an input event for content included in a chatroom in the chatroom. That is, the event recognizer 310 may recognize the screenshot request or the sharing request that is an input event associated with content as an instruction for calling a copyright protection function in the chatroom.

In operation S1420, in response to recognizing the input event corresponding to the instruction for calling the copyright protection function in the chatroom, the notification forwarder 320 may forward, to an original content creator, a notification for content specified as a copyright protection target for a chatroom content protection. In the case of the screenshot request, content included in a screenshot range of the chatroom may be specified as the copyright protection target. In the case of the sharing request, content selected to share with another chatroom or another medium may be specified as the copyright protection target. Here, the notification forwarder 320 may forward the notification for the screenshot request or the sharing request to an original content creator of the content specified as the copyright protection target. The notification may include chatroom information capable of identifying the chatroom, for example, an ID or a URL of the chatroom in which the input event is recognized. In some example embodiments, the notification may include a callback URL for responding with an approval intent from the original content creator to allow the other user to use the content.

In operation S1430, the marker 330 may determine whether the original content creator approves use of the content specified as the copyright protection target through the notification. The marker 330 may receive an approval intent or a disapproval intent of the original content creator for the use of the content from the electronic device 120 of the original content creator through the notification forwarded to the original content creator.

In operation S1440, in response to receiving the approval intent from the electronic device 120 of the original content creator with respect to the content specified as the copyright protection target, the marker 330 may add, to the content, the mark that includes chatroom information. For example, the marker 330 may create a mark that includes information capable of identifying the chatroom in which the input event is recognized, for example, an ID or a URL of the chatroom, and may add the mark to the content specified as the copyright protection target in response to the input event.

In operation S1450, once the notification is forwarded to the original content creator of the content specified as the copyright protection target, the function executer 340 may execute a function, for example, a screenshot function or a sharing function, corresponding to the input event recognized in operation S1410 for the content to which the mark is added. That is, in response to the input event for the chatroom, the function executer 340 may capture and store or share the content specified as the copyright protection target in a state in which the mark is added to the content.

If the original content creator disapproves the use of the content in operation S1430, the processor 212 may process a screenshot or sharing of the corresponding content to be disallowed. For example, if the original content creator disapproves the use of the content, the processor 212 may determine that the screenshot or sharing of the content is impossible (or is not allowed) and may output a message that rejects the screenshot request or the sharing request.

Also, if the notification is forwarded to at least two original content creators, the processor 212 may add a mark to content of an original content creator that sends an approval intent and may process a screenshot or sharing to be disallowed for content of an original content creator that sends a disapproval intent. For example, as described above with reference to FIG. 12, if chat contents included in the screenshot range 1210 relates to messages of the user A and the user B, a notification may be forwarded to the user A and the user B. Here, if the user A approves use of content and the user B disapproves use of content, the processor 212 may execute screenshot or sharing by excluding the message of the user B and by adding a mark only to the message of the user A.

Therefore, in response to an input event, for example, a screenshot request or a sharing request, corresponding to an instruction for calling a copyright protection function in the chatroom, the processor 212 may provide a notification to an original content creator having sent an original version of the content specified as the copyright protection target and also add, only to the content of which use is approved by the original content creator, the mark that includes chatroom information and capture and store or share the content to which the mark is added through the notification.

Although the description is made based on an example of adding a mark to content in response to an input event corresponding to each of an upload request, a screenshot request, and a sharing request, the mark may be added to the content in an initial stage (e.g., an upload or screenshot stage), or in a final stage (e.g., a sharing stage) depending on some example embodiments. That is, the mark may be added to the content in the upload stage and then screenshot or sharing may be allowed only to the content to which the mark is added. In some example embodiments, the mark may be added to the content in the screenshot stage and then sharing may be allowed only to the content to which the mark is added. In some other example embodiments, the mark may be added to the content in the sharing stage for sharing the uploaded or screenshotted content such that the content may be shared in a state in which the mark is added.

According to example embodiments, it is possible to add a mark (e.g., a QR code and a watermark) including chatroom information to content to be uploaded, screenshotted, or shared in a chatroom for protecting contents in the chatroom, or to provide a notification for use of content to an original content creator having sent an original version of the content in response to a screenshot request or a sharing request for the content in the chatroom. The processor 212 may protect copyrights in the chatroom using the mark or the notification and may track the use of the content of which a copyright is to be protected through interaction with the server 150.

Although it is described that the content protection method is performed by the electronic device 110 in response to an instruction provided from an application (e.g., a messenger) installed on the electronic device 110, it is provided as an example only. According to some example embodiments, at least a portion of the content protection method may be performed on the side of the server 150 through interaction with the application (e.g., the messenger) installed on the electronic device 110.

For example, the processor 222 of the server 150 may include an event recognizer, a notification forwarder, a marker, a function executer, and a content manager such that the server 150 may perform at least a portion of the content protection method. Depending on example embodiments, the event recognizer, the notification forwarder, marker, the function executer, and the content manager may be selectively included in or excluded from the processor 222 of the server 150 and may be separated or merged for functional representation of the processor 222.

The event recognizer, the notification forwarder, the marker, the function executer, and the content manager included in the processor 222 of the server 150 perform the functionality identical or corresponding to the event recognizer 310, the notification forwarder 320, the marker 330, the function executer 340, and the content manager 350 of FIG. 3. Therefore, further description is omitted.

According to some example embodiments, it is possible to add a mark that includes chatroom information to content to be uploaded to a chatroom, and to provide an access to the chatroom that is a source of content using the mark added to the content. According to some example embodiments, in response to a screenshot request or a sharing request for content in a chatroom, it is possible to add a mark to the content and to store as a screenshot or share the content to which the mark is added. According to some example embodiments, in response to a screenshot request or a sharing requesting for content in a chatroom, it is possible to forward a notification to an original content creator and to execute screenshot or sharing according to approval of the original content creator for the content.

The systems or apparatuses described above may be implemented using hardware components, and/or a combination software components and hardware components. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to the above-described example embodiments may be configured in a form of program instructions performed through various computer devices and recorded in non-transitory computer-readable media. The media may also include, alone or in combination with the program instructions, data files, data structures, and the like. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as read-only memory (ROM), random access memory (RAM), flash memory, and the like. Examples of other media may include recording media and storage media managed by Appstore that distributes applications or a site, a server, and the like that supplies and distributes other various types of software. Examples of program instructions include both machine code, such as produced by a compiler, and files containing higher level code that may be executed by the computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. A content protection method implemented by a computer system comprising at least one processor configured to execute computer-readable instructions included in a memory, the method comprising:
    adding, by the at least one processor, a mark to content in a chatroom, the mark including chatroom information for identifying the chatroom in response to a user request from a user associated with the content in the chatroom, the adding comprising providing an edit user interface (UI) for adjusting the mark added to the content; and
    executing, by the at least one processor, a function corresponding to the user request using the content to which the mark is added.

2. The method of claim 1, wherein the adding comprises determining at least one of a size or a position of the mark to be added to the content based on an image-based analysis result of the content.

3. The method of claim 1, wherein the adding comprises receiving a mark addition request from the user every time the user request is recognized, or receiving the mark adding request in advance.

4. The method of claim 1, wherein the mark includes chatroom information used for an electronic device of another user sharing the content.

5. The method of claim 1, further comprising:
    creating the mark in an image or pattern form recognizable at a server, to make a sharing path of the content trackable through an interaction with the server, and
    displaying tracking information about the sharing path of the content through the mark on an electronic device of another user sharing the content.

6. The method of claim 1, further comprising:
    forwarding, by the at least one processor, a notification to an electronic device of at least one original content creator having sent an original version of the content in the chatroom, the forwarding being in response to recognizing a screenshot request or a sharing request as the user request for the content.

7. The method of claim 6, wherein the forwarding comprises selecting at least one contact having sent a message included in a screenshot range as at least one notification forward target, in response to designating the screenshot range in the chatroom.

8. The method of claim 7, wherein the selecting comprises analyzing chat content included in the screenshot range, and excluding one or more contacts from the at least one notification forward target.

9. The method of claim 6, wherein
    the notification includes a function for sending an intent from the at least one original content creator regarding whether to approve use of the content, and
    the adding comprises adding the mark to the content in response to receiving an approval intent from an electronic device of the at least one original content creator through the notification.

10. The method of claim 9, wherein the adding comprises, in response to the notification being forwarded to the at least one original content creator including two or more original content creators,
    adding the mark to the content of one of the at least one original content creator that sends an approval intent, and
    disallowing a screenshot operation and a sharing operation for the content of another of the at least one original content creator that sends a disapproval intent.

11. The method of claim 1, further comprising:
    accessing, by the at least one processor, a storage space associated with a screenshot at a point in time at which a desired period of time elapses based on a point in time at which a screenshot request is recognized, in response to recognizing the screenshot request as the user request for the content; and
    leaving first content, by the at least one processor, to which the mark is added and deleting second content, by the at least one processor, to which the mark is not added, from among contents stored in the storage space during the desired period of time.

12. A non-transitory computer-readable record medium storing instructions that, when executed by at least one processor, cause a computer system to perform a content protection method, the content protection method comprising:

adding a mark to content in a chatroom, the mark including chatroom information for identifying the chatroom in response to a user request from a user associated with the content in the chatroom, the adding comprising providing an edit user interface (UI) for adjusting the mark added to the content; and executing a function corresponding to the user request using the content to which the mark is added.

13. A computer system comprising:

at least one processor configured to execute computer-readable instructions included in a memory, wherein the at least one processor is configured to, add a mark to content in a chatroom, the mark including chatroom information for identifying the chatroom in response to a user request from a user associated with the content in the chatroom, execute a function corresponding to the user request using the content to which the mark is added, and provide an edit user interface (UI) for adjusting the mark added to the content.

14. The computer system of claim 13, wherein the mark includes chatroom information used for an electronic device of another user sharing the content.

15. The computer system of claim 13, wherein the at least one processor is further configured to forward a notification to an electronic device of at least one original content creator having sent an original version of the content in the chatroom, in response to recognizing a screenshot request or a sharing request as the user request for the content.

16. The computer system of claim 15, wherein the at least one processor is further configured to select at least one contact having sent a message included in a screenshot range as at least one notification forward target in response to designating the screenshot range in the chatroom.

17. The computer system of claim 15, wherein the notification includes a function for sending an intent from the at least one original content creator regarding whether to approve use of the content from the original content creator, and the at least one processor is further configured to add the mark to the content in response to receiving an approval intent from an electronic device of the at least one original content creator through the notification.

18. The computer system of claim 13, wherein the at least one processor is further configured to, access a storage space associated with a screenshot at a point in time at which a desired period of time elapses based on a point in time at which a screenshot request is recognized, in response to recognizing the screenshot request as the user request for the content, and leave first content to which the mark is added and delete second content to which the mark is not added, from among contents stored in the storage space during the desired period of time.

* * * * *